G. D. HOUSTON.
THREE HORSE EVENER.
APPLICATION FILED APR. 29, 1918.
1,305,366.
Patented June 3, 1919.
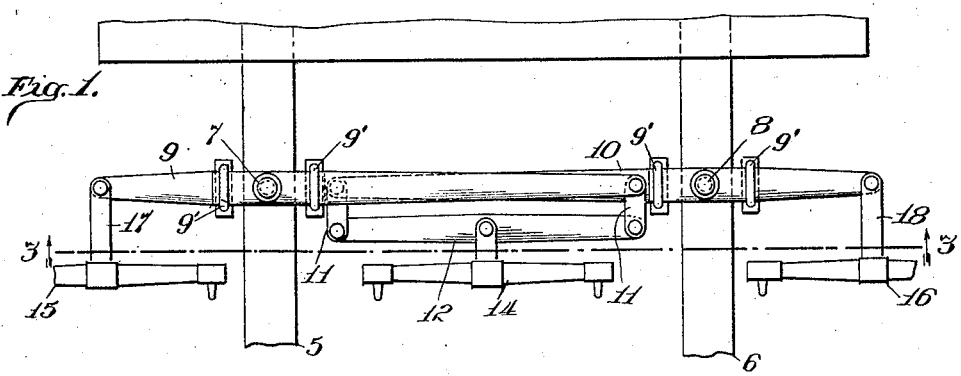
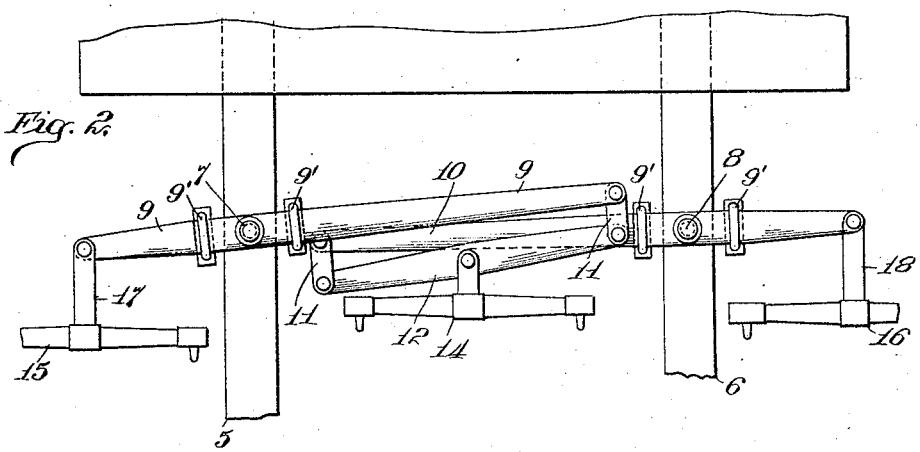
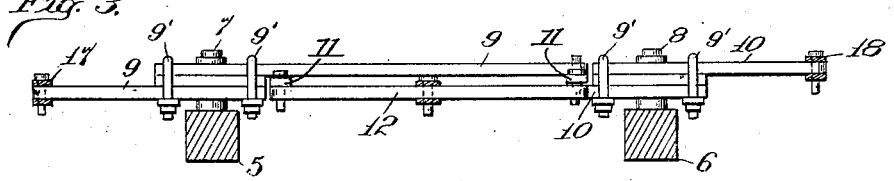
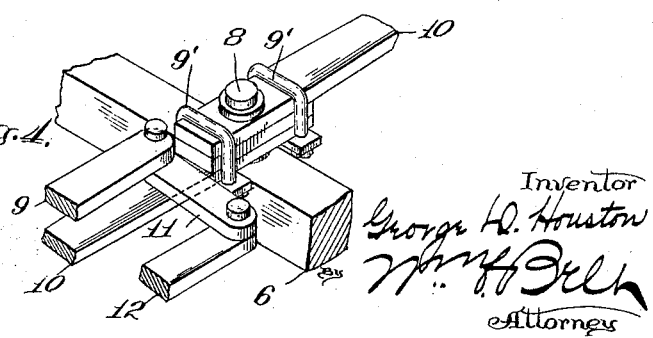
Inventor
George D. Houston
by Wm. H. Bell
Attorney

UNITED STATES PATENT OFFICE.

GEORGE D. HOUSTON, OF RUSHVILLE, ILLINOIS.

THREE-HORSE EVENER.

1,305,366.     Specification of Letters Patent.     Patented June 3, 1919.

Application filed April 29, 1918. Serial No. 231,307.

*To all whom it may concern:*

Be it known that I, GEORGE D. HOUSTON, a citizen of the United States, residing at Rushville, in the county of Schuyler and State of Illinois, have invented certain new and useful Improvements in Three-Horse Eveners, of which the following is a specification.

My invention relates to a three horse evener particularly adapted for use in connection with farm machinery, although not necessarily limited to such use, and has for its primary object the provision of an evener which insures the distribution of the load equally to each of the three horses, so that the latter are required to do their proportionate share of the work.

Further objects and advantages of my invention will be apparent as it is better understood by reference to the following specification when read in connection with the accompanying drawing illustrating the preferred embodiment thereof, in which—

Figure 1 is a plan view of the invention;

Fig. 2 is a similar view illustrating the parts in different positions;

Fig. 3 is a section on the line 3—3 of Fig. 1, and

Fig. 4 is an enlarged view in perspective of a portion of the structure.

Referring to the drawing, 5 and 6 indicate draft tongues of a vehicle such for example as a cultivator. Pivotally mounted, by means of bolts 7 and 8, on the tongues 5 and 6 are a pair of levers 9 and 10. These levers are preferably, though not necessarily constructed in sections, securely connected by clevises 9′ in order that the inner arms of the levers may be disposed in different planes. The pivotal axes of the levers 9 and 10 are spaced from the outer ends thereof, a distance substantially equal to one third the length thereof. The inner arms of the levers 9 and 10 overlie each other when disposed in the position indicated in Fig. 1 and are connected by links 11 (Fig. 4) to the ends of a bar 12. The bar 12 supports a swingle-tree 14 which is pivotally connected to the bar medially thereof. Swingle-trees 15 and 16 are connected by links 17 and 18 to the outer ends of the levers 9 and 10.

From the foregoing description and by reference to the drawing, particularly Fig. 2, the operation of the evener will be readily understood. The outer horses are connected to the swingle-trees 15 and 16 and the draft forces are applied to the tongues 5 and 6 through the links 17 and 18 and the levers 9 and 10. The center horse being connected to the swingle-tree 14 pulls on both of the levers 9 and 10, and by reason of the connection of the bar 12 to the inner ends of the levers 9 and 10, the center horse is required to pull exactly one-third of the load. Should one of the horses tend to advance more rapidly than the others, the levers 9 and 10 may assume the position indicated in Fig. 2, but without disturbing the relative portions of the load distributed to the respective horses. In use the levers 9 and 10 oscillate continuously but each horse is required at all times to do his full share of the work.

From the foregoing, it will be readily understood that I have perfected a three horse evener which is extremely simple in construction and relatively inexpensive, and which successfully solves the problem of distributing the load to the draft horses.

Various changes may be made in the form, construction and arrangement of the parts without departing from the spirit and scope of the invention or sacrificing any of its material advantages, the form hereinbefore described being merely a preferred embodiment thereof.

I claim:

1. A three horse evener comprising two levers pivotally mounted to swing in horizontal planes and with their inner arms overlapping, swingle-trees connected to the outer ends of said levers, a bar movable conjointly with and relatively to the inner arms of said levers and pivotally connected therewith, and a swingle-tree pivotally connected to said bar medially thereof.

2. A three horse evener comprising two levers pivotally mounted to swing in horizontal planes with their longer arms overlapping, a swingle-tree connected to the end of the shorter arm of each lever, a link pivotally connected to the end of the longer arm of each lever, a bar pivotally connected to said links and held in spaced relation to said arms, and a swingle-tree pivotally connected to said bar medially thereof.

GEORGE D. HOUSTON.

Witnesses:
KATE B. BAGLEY,
BRUCE SHINDEL.

Copies of this patent may be obtained for five cents each, by addressing the "Commissioner of Patents, Washington, D. C."